United States Patent
Hinson

(10) Patent No.: US 9,509,247 B1
(45) Date of Patent: Nov. 29, 2016

(54) GREENHOUSE USED AS A SOLAR PANEL SUPPORT STRUCTURE

(71) Applicant: David Fredrick Hinson, Phoenix, AZ (US)

(72) Inventor: David Fredrick Hinson, Phoenix, AZ (US)

(73) Assignees: David Fredrick Hinson, Phoenix, AZ (US); Robert Joseph Humel, Fountain Hills, AZ (US)

( * ) Notice: Subject to any disclaimer, the term of this patent is extended or adjusted under 35 U.S.C. 154(b) by 0 days.

(21) Appl. No.: 15/230,184

(22) Filed: Aug. 5, 2016

Related U.S. Application Data

(60) Provisional application No. 62/202,223, filed on Aug. 7, 2015.

(51) Int. Cl.
*H01L 31/054* (2014.01)
*H02S 20/23* (2014.01)
*A01G 9/24* (2006.01)

(52) U.S. Cl.
CPC ............... *H02S 20/23* (2014.12); *A01G 9/243* (2013.01); *H02S 20/32* (2014.12)

(58) Field of Classification Search
CPC ............. H01L 31/0522; H01L 31/052; H01L 31/0527
USPC .................................................. 136/246, 259
See application file for complete search history.

(56) References Cited

U.S. PATENT DOCUMENTS

| | | | | |
|---|---|---|---|---|
| 4,106,952 A * | 8/1978 | Kravitz | ................... | H01L 23/38 126/634 |
| 4,134,393 A * | 1/1979 | Stark | .................... | B01D 5/0066 126/581 |
| 4,198,953 A * | 4/1980 | Power | .................... | A01G 9/243 126/617 |
| 4,210,121 A * | 7/1980 | Stark | ........................ | B01D 3/00 126/573 |
| 4,215,672 A * | 8/1980 | Chiapale | ................ | A01G 9/243 126/640 |
| 4,219,008 A * | 8/1980 | Schultz | .................. | A01G 9/243 126/592 |
| 4,249,516 A * | 2/1981 | Stark | ........................ | F24J 2/067 126/601 |
| 4,284,839 A * | 8/1981 | Johnson | ..................... | F24J 2/06 126/573 |
| 4,529,269 A * | 7/1985 | Mutzhas | ................ | G02B 5/208 359/359 |

(Continued)

*Primary Examiner* — Golam Mowla

(57) ABSTRACT

A greenhouse used as a solar panel support structure maintains the usability of the greenhouse through at least one solar panel assembly in order to produce electricity, as well as, optimize light exposure for enclosed plants. The at least one solar panel assembly includes an array and a solar tracker. The array is a photo-voltaic module to convert solar energy into electrical energy to power the greenhouse, other onsite devices, or to export excess energy to a local electrical grid. The array is positioned to receive sunlight to produce electrical energy or provide sunlight exposure to a plurality of plants positioned within the greenhouse. The solar tracker controls the position of the array to move in accordance to sun exposure during a solar day, to maximize electrical power generation, and to allow shade created by the array to move evenly within the greenhouse.

9 Claims, 4 Drawing Sheets

(56) References Cited

U.S. PATENT DOCUMENTS

| | | | | |
|---|---|---|---|---|
| 4,567,732 | A * | 2/1986 | Landstrom | A01G 9/246 47/17 |
| 4,969,288 | A * | 11/1990 | Mori | A01G 1/04 47/1.1 |
| 5,220,462 | A * | 6/1993 | Feldman, Jr. | F24J 2/085 126/684 |
| 7,227,077 | B2 * | 6/2007 | Kleinwachter | A01G 9/1438 126/600 |
| 7,557,292 | B2 * | 7/2009 | Shingleton | F24J 2/04 126/600 |
| 8,156,685 | B2 * | 4/2012 | Kleinwaechter | A01G 9/1438 47/17 |
| 8,915,015 | B1 * | 12/2014 | Augspurger | A01G 9/14 47/17 |
| 9,322,574 | B2 * | 4/2016 | von Behrens | F24J 2/42 |
| 2007/0095385 | A1 * | 5/2007 | Shin | H01L 31/0543 136/246 |
| 2009/0301469 | A1 * | 12/2009 | Scrimgeour | F24J 2/06 126/698 |
| 2009/0314347 | A1 * | 12/2009 | Kleinwaechter | A01G 9/243 136/259 |
| 2012/0152307 | A1 * | 6/2012 | MacGregor | F24J 2/1047 136/246 |
| 2013/0312812 | A1 * | 11/2013 | Meyer | H02S 20/30 136/246 |

* cited by examiner

GREENHOUSE USED AS A SOLAR PANEL SUPPORT STRUCTURE

The current application claims a priority to the U.S. Provisional Patent application Ser. No. 62/202,223 filed on Aug. 7, 2015.

FIELD OF THE INVENTION

The present invention relates generally to structural configurations and clean energy. More specifically, the present invention is a greenhouse incorporating solar panels with a corresponding solar tracker to generate electricity for the greenhouse to operate, other onsite uses, or to export to a local electrical grid.

BACKGROUND OF THE INVENTION

Solar photo-voltaic modules or solar panels are used to convert solar energy into direct electrical current, being electrically connected and mounted to a supporting structure. Solar panels increase the value of buildings as solar panels assist in generating electricity for the building or for the purpose of providing energy to the electrical grid. Traditionally, solar panels would be fixed to the roof of a building. This presents a problem with greenhouses as affixing solar panels to the roof of a greenhouse would restrict the light able to pass through the roof to be absorbed by plants. The incorporation of solar panels on a greenhouse would allow for the efficient use of space by providing a space for electrical energy production, as well as agricultural space. The fixed solar panels are oriented to receive light throughout the day as the sun travels east to west. As the sun traverses overhead from east to west, there are solid bands of shade produced under each row of solar panels. This makes the space underneath the solar panels unusable for greenhouses.

It is therefore an objective of the present invention to manage the solar panel array position on greenhouses with solar panel arrays. The solar tracker supports the solar panel array such that the solar panel array is able to rotate to receive sunlight, while also being able to rotate to allow plants within the greenhouse to receive light. The present invention widens the possibilities for solar production and for expansion of high production agriculture as the present invention would lower operating costs for the greenhouse while producing plants to be sold for profit.

DETAIL DESCRIPTIONS OF THE INVENTION

All illustrations of the drawings are for the purpose of describing selected versions of the present invention and are not intended to limit the scope of the present invention.

The present invention is a greenhouse used as a solar panel support structure. The present invention implements photo-voltaic technology on a greenhouse to maximized energy production as well as to allow for optimal light through the greenhouse to be absorbed by plants. The photo-voltaic technology produces electricity to be used to power electrical components of the present invention, as well as, provide excess electricity to a local power grid. In accordance to FIG. 1, the present invention comprises the greenhouse 1, at least one solar panel assembly 2 and a control unit 3. The greenhouse 1 allows for the regulation of climate conditions for growing plants. The at least one solar panel assembly 2 is used to convert solar energy into electrical energy. The control unit 3 signals the at least one solar panel assembly 2 to adjust the position for the at least one solar panel assembly 2 to receive sunlight more directly or limit light exposure to plants housed within the greenhouse 1.

Figure 1:
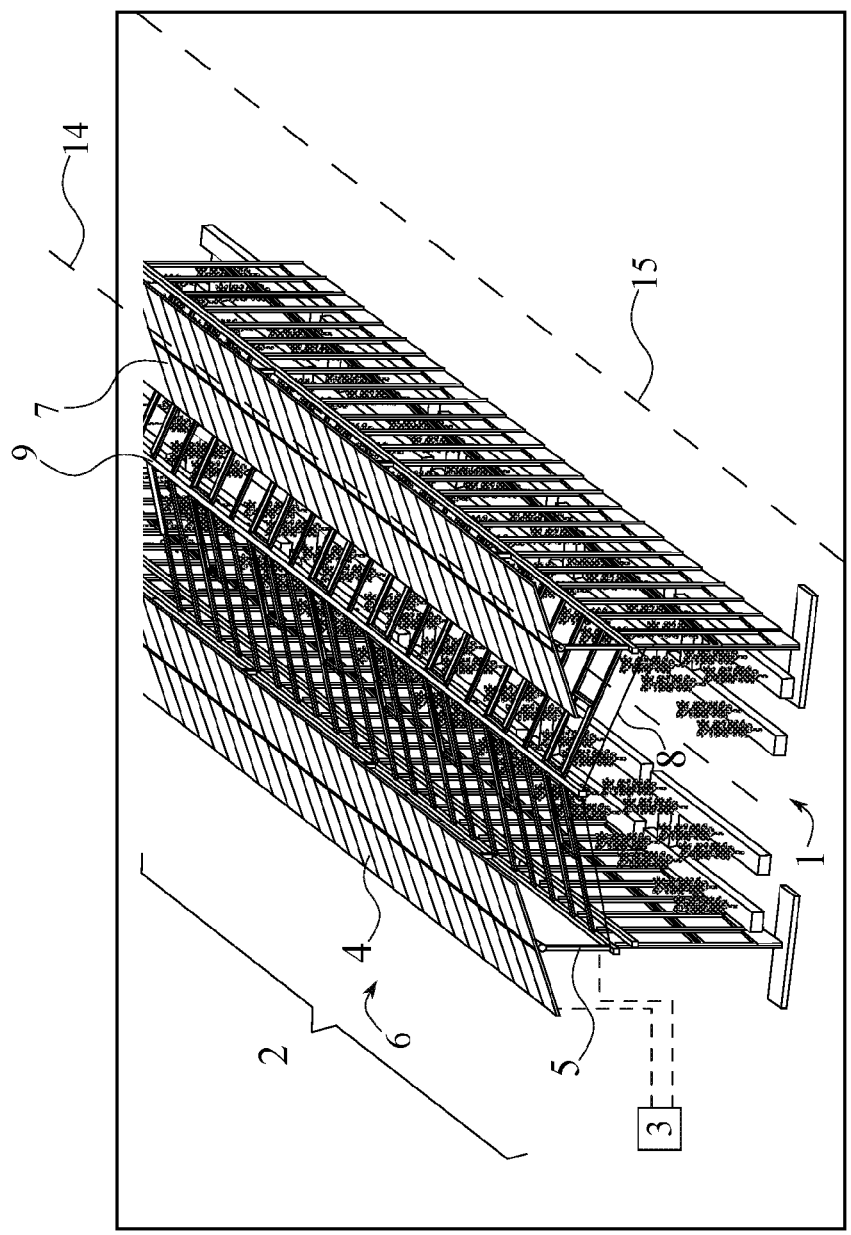
FIG. 1 is a perspective view of the present invention illustrated with the at least one solar panel assembly, wherein the at least one solar panel assembly is a first solar panel assembly and a second solar panel assembly is supported above the greenhouse.

Further in accordance to FIG. 1, each of the at least one solar panel assembly 2 comprises an array 4 and a solar tracker 5. The array 4 is a series of photo-voltaic modules which convert solar energy into electrical energy. The solar tracker 5 is a support for the array 4 which directly controls the motion of the array 4. The solar tracker 5 is mounted adjacent to the greenhouse 1. The solar tracker 5 is preferred to be a single-axis solar tracker such that the array 4 is able to rotate about the length of the solar tracker 5. Consequently, the array 4 is rotatably connected to the solar tracker 5. The array 4 is offset from a roof 8 of the greenhouse 1 by the solar tracker 5, such that the array 4 is able rotate freely about the solar tracker 5 without being obstructed by the greenhouse 1.

In order to optimize the electricity production of the array 4, a rotation axis 14 of the solar tracker 5 is oriented parallel to a proximal meridian 15 of the Earth, as shown in FIG. 1. This orientation allows for a photo-voltaic surface of the array 4 to be constantly oriented towards the Sun throughout a solar day in order to maximize electrical energy production. The solar tracker 5 is electrically connected to the control unit 3 in order for the solar tracker 5 to receive a control signal from the control unit 3 to manipulate the array 4. The control unit 3 and the solar tracker 5 are electrically connected to the array 4 in order for the array 4 to provide supplemental power for the control unit 3 and the solar tracker 5 to operate.

In one embodiment of the present invention, the at least one solar panel assembly 2 is a first solar panel assembly 6 and a second solar panel assembly 7, as detailed in FIG. 1. The first solar panel assembly 6 is positioned adjacent to the greenhouse 1. Similarly, the second solar panel assembly 7 is positioned adjacent to the greenhouse 1, opposite to the first solar panel assembly 6. The first solar panel assembly 6 and the second solar panel assembly 7 are positioned parallel to an apex ridge 9 of the roof 8. This configuration allows for sunlight to pass through a significant portion of the roof 8 unhindered by the first solar panel assembly 6 and the second solar panel assembly 7 over a solar day. The first solar panel assembly 6 and the second solar panel assembly 7 generate electricity to power the electrical components of the greenhouse 1 twice as effectively than a single array of the at least one solar panel assembly 2.

Figure 2:
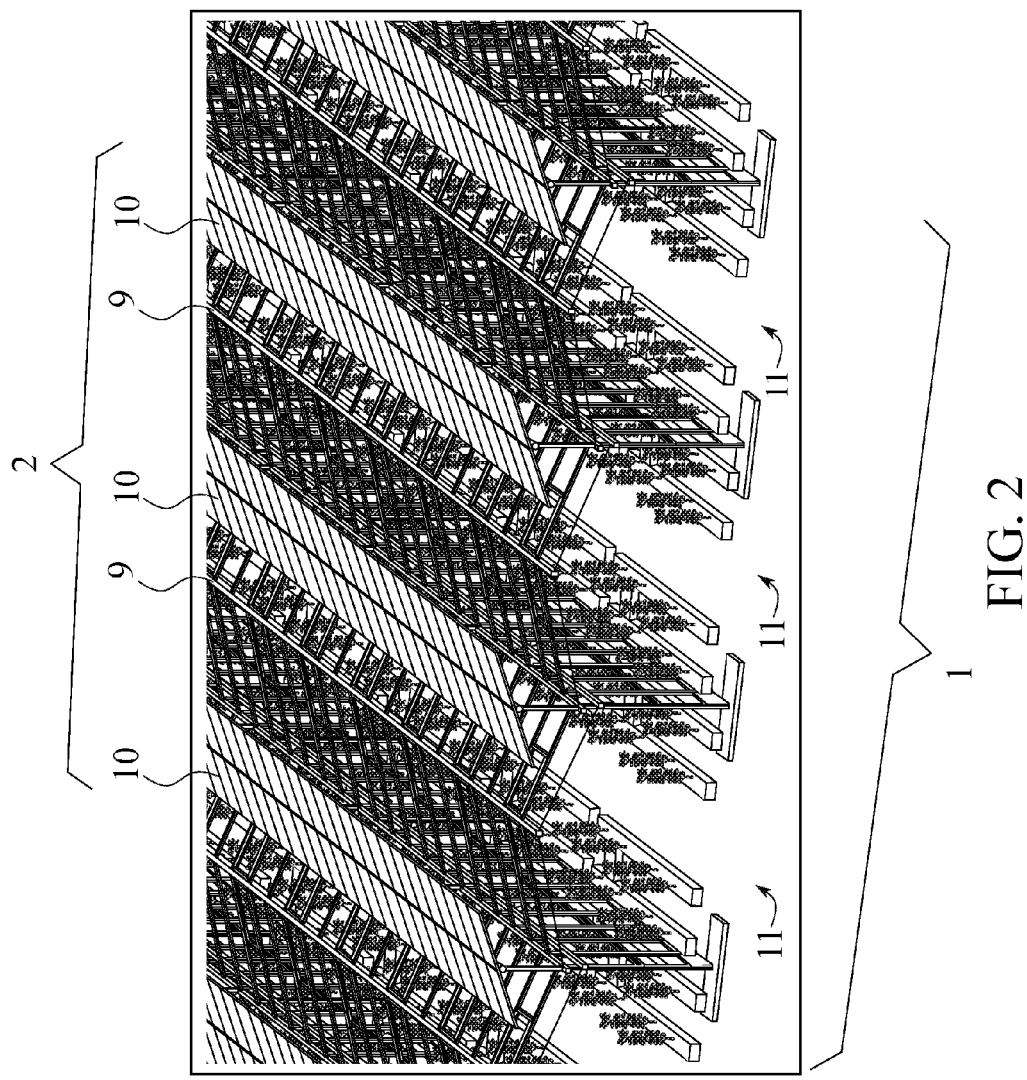
FIG. 2 is a perspective view for an embodiment of the greenhouse, wherein the greenhouse includes a series of pitch-roofed structures and wherein a plurality of solar panel assemblies is distributed amongst the series of pitch-roofed structures.

In another embodiment of the present invention, the at least one solar panel assembly 2 is a plurality of solar panel assemblies 10, and the greenhouse 1 comprises a series of pitch-roofed structures 11, as shown in FIG. 2. The series of pitch-roofed structures 11 partitions the greenhouse 1 in order to allow the user to separate plants in accordance to their optimal growing conditions, such as light exposure, temperature, and humidity, for each of the series of pitch-roofed structures 11. The plurality of solar panel assemblies 10 is interspersed amongst the series of pitch-roofed structures 11 in order to maximize the area for the absorption of sunlight by the plurality of solar panel assemblies 10. Similar to the first solar panel array 4 and the second solar panel array 4, the plurality of solar panel assemblies 10 is positioned parallel to an apex ridge 9 for each of the pitch-roofed structures 11 in order for significant sunlight to pass through the roof 8 for each of the series of pitch-roofed structures 11 unhindered by the plurality of solar panel assemblies 10 to be absorbed by the plants housed within the greenhouse 1.

Figure 3:
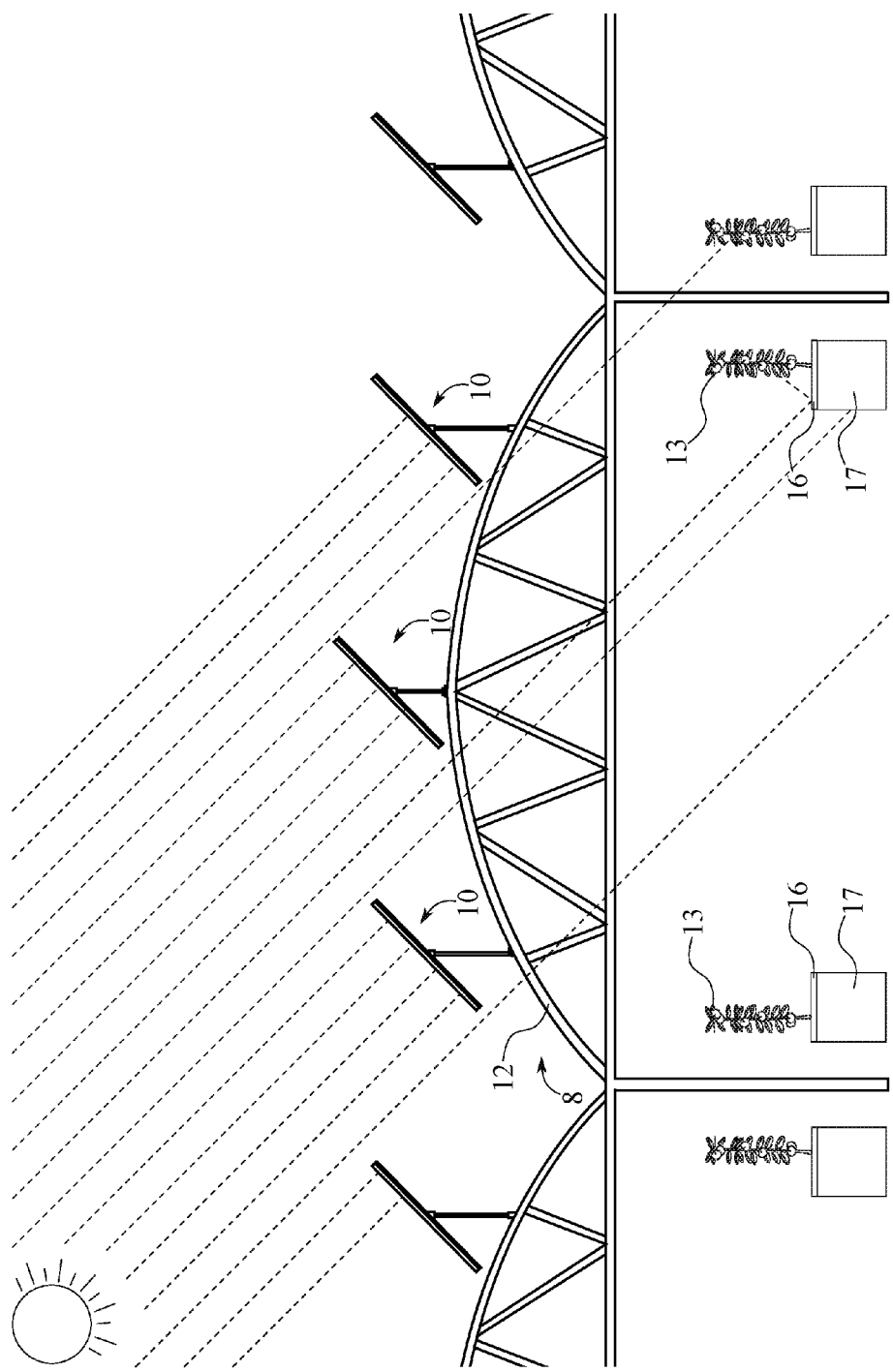
FIG. 3 is a lateral schematic view of an embodiment of the greenhouse, wherein the greenhouse includes an arch-shaped truss structure, and wherein the at least one solar panel assembly is distributed about the arch-shaped truss structure.

In still another embodiment of the present invention, the at least one solar panel assembly 2 is a plurality of solar panel assemblies 10, and the roof 8 of the greenhouse 1 is an arch-shaped truss structure 12, as detailed in FIG. 3. The plurality of solar panel assemblies 10 is radially distributed about the arch-shaped truss structure 12. The plurality of solar panel assemblies 10 is offset from each other such that the rotation for an arbitrary solar assembly of the plurality of solar panel assemblies 10 is not restricted by another solar assembly.

In accordance to the method of managing each array 4 for a solar powered greenhouse 1, the method requires a series of solar time scheduling blocks stored on the control unit 3. The series of solar time scheduling blocks refers to a dataset for the position of the sun over the course of a solar day. Each of the series of solar time scheduling blocks includes a specific time period and an optimal panel position. The specific time period is an arbitrary time over the course of the solar day. The optimal panel position is the position of the array 4 which is oriented perpendicular to the direction of sunlight in order for the array 4 to maximize electrical energy production, as shown between FIG. 3 and FIG. 4.

In implementation of the present invention, the user is able to select time periods to shade portions of the greenhouse 1 in order to limit the light exposure to plants within the greenhouse 1 for plants that are light sensitive or to evenly distribute the light amongst the plants within the greenhouse 1. The user is prompted to select at least one shade-inducing block from the series of solar time scheduling blocks through the control unit 3. The at least on shade-inducing block is the time period and position for the array 4 that the user desires to change in order to provide shading for a portion of the greenhouse 1. If the at least one shade-inducing block is selected from the series of solar time scheduling blocks, a reorientation panel position is received for each of the at least one shade-inducing blocks through the control unit 3. The user defines the reorientation panel position as the position for the array 4 to provide light exposure in accordance to the optimal plant growth light exposure for plants within the greenhouse 1. The reorientation panel position is a position for the array 4 that obscures direct sunlight onto specific portions and is not perpendicular to direct sunlight to shade plants within the greenhouse 1. The reorientation panel position favors managing the light exposure for optimal plant grow over the production electrical energy. Subsequently, the optimal panel position is replaced with reorientation panel position for each of the shade-inducing blocks with the control unit 3. Ultimately, a rotation of the array 4 is managed with the solar tracker 5 according to the optimal panel position or the reorientation panel position during each of the solar time scheduling blocks in order to produce electrical energy or to promote optimal plant growth.

Figure 4:
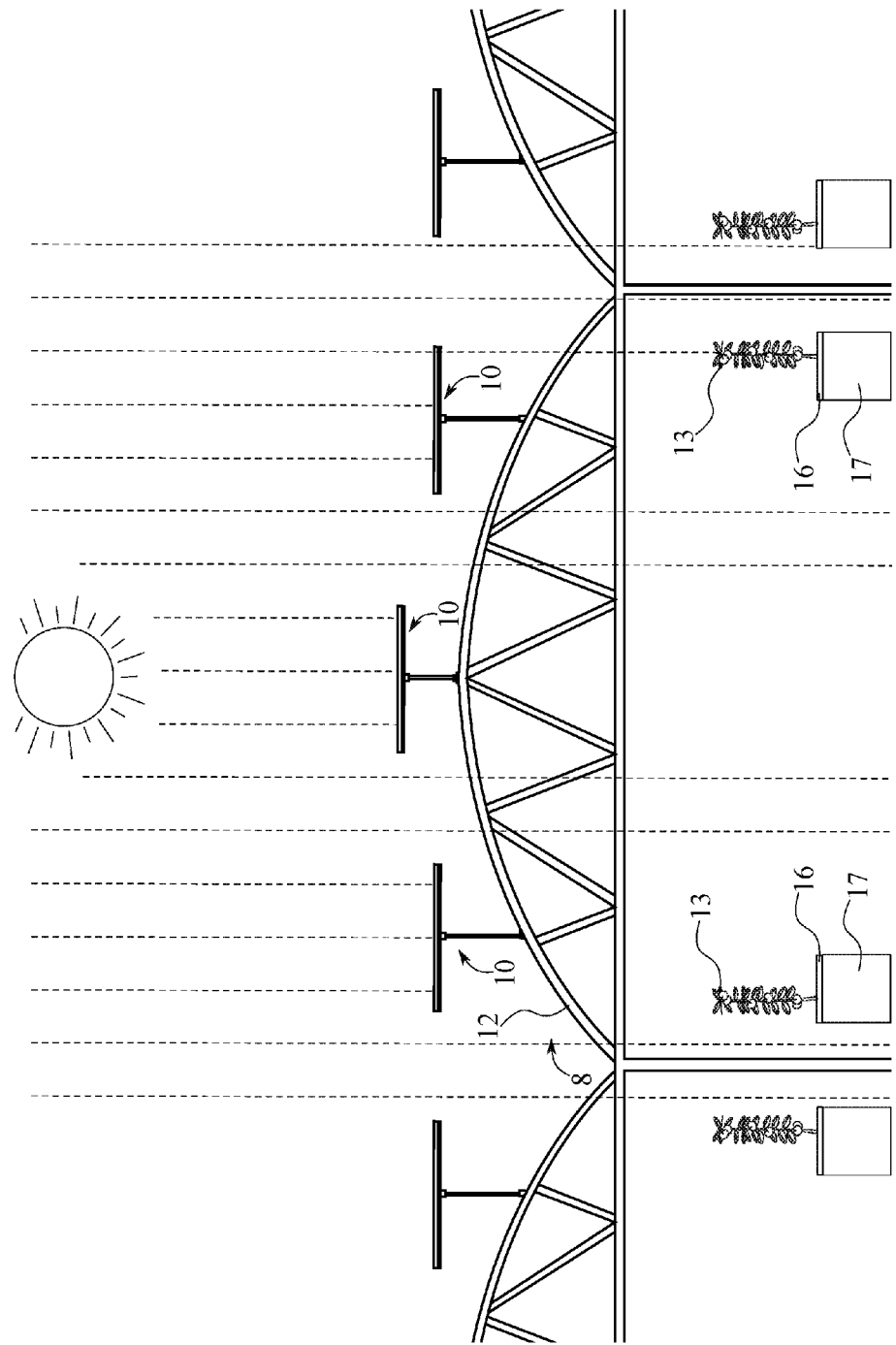
FIG. 4 is a lateral schematic view of an embodiment of the greenhouse, wherein the greenhouse includes an arch-shaped truss structure and wherein the at least one solar panel assembly is positioned to receive light at the height of a solar day.

In accordance to the preferred embodiment of the present invention, a plurality of plants 13 is positioned within the greenhouse 1 in order to regulate climatic conditions for the plurality of plants 13, as detailed in FIG. 3 and FIG. 4. During a solar day, the at least one solar panel assembly 2 shades approximately one-quarter of the sunlight that would be received normally without the at least one solar panel assembly 2 present. In a more specific embodiment of the present invention, the present invention comprises a reflective surface 16. The reflective surface 16 is located in between the plurality of plants 13 and a base 17 of the greenhouse 1. The reflective surface 16 allows for sunlight, which is not directly absorbed by the plurality of plants 13 from the sun, to be reflected onto plants of the plurality of plants 13 local to the incident point of sunlight on the reflective surface 16.

Although the invention has been explained in relation to its preferred embodiment, it is to be understood that many other possible modifications and variations can be made without departing from the spirit and scope of the invention as hereinafter claimed.

What is claimed is:

1. A greenhouse used as a solar panel support structure comprises:
    a greenhouse;
    at least one solar panel assembly;
    a control unit;
    a plurality of plants; and
    a reflective surface;
        wherein each of the at least one solar panel assembly comprises an array and a solar tracker,
        the solar tracker being mounted adjacent to the greenhouse,
        the array being rotatably connected to the solar tracker,
        the array being positioned offset to a roof of the greenhouse by the solar tracker,
        the solar tracker being electronically connected to the control unit the control unit and the solar tracker being electrically connected to the array,
        the plurality of plants being positioned within the greenhouse, and
        the reflective surface being located in between the plurality of plants and a base of the greenhouse.

2. The greenhouse used as a solar panel support structure, as claimed in claim 1, comprises:
    wherein the at least one solar panel assembly is a first solar panel assembly and a second solar panel assembly;
    the first solar panel assembly being positioned adjacent to the greenhouse;
    the second solar panel assembly being positioned adjacent to the greenhouse, opposite to the first solar panel assembly; and
    the first solar panel assembly and the second solar panel assembly being positioned parallel to an apex ridge of the roof.

3. The greenhouse used as a solar panel support structure, as claimed in claim 1, comprises:

wherein the at least one solar panel assembly is a plurality of solar panel assemblies;

the greenhouse comprises a series of pitch-roofed structures;

the plurality of solar panel assemblies being interspersed amongst the series of pitch-roofed structures; and the plurality of solar panel assemblies being positioned parallel to an apex ridge for each of the pitch-roofed structures.

4. The greenhouse used as a solar panel support structure, as claimed in claim 1, comprises:

wherein the at least one solar panel assembly is a plurality of solar panel assemblies;

the roof of the greenhouse being an arch-shaped truss structure; and the plurality of solar panel assemblies being radially distributed about the arch-shaped truss structure.

5. The greenhouse used as a solar panel support structure, as claimed in claim 1, wherein a rotation axis of the solar tracker is oriented parallel to a proximal meridian of the Earth.

6. The greenhouse used as a solar panel support structure, as claimed in claim 1, comprises:

wherein the at least one solar panel assembly is a first solar panel assembly and a second solar panel assembly;

the first solar panel assembly being positioned adjacent to the greenhouse;

the second solar panel assembly being positioned adjacent to the greenhouse, opposite to the first solar panel assembly; and the first solar panel assembly and the second solar panel assembly being positioned parallel to an apex ridge of the roof.

7. The greenhouse used as a solar panel support structure, as claimed in claim 1, comprises:

wherein the at least one solar panel assembly is a plurality of solar panel assemblies;

the greenhouse comprises a series of pitch-roofed structures;

the plurality of solar panel assemblies being interspersed amongst the series of pitch-roofed structures; and the plurality of solar panel assemblies being positioned parallel to an apex ridge for each of the pitch-roofed structures.

8. The greenhouse used as a solar panel support structure, as claimed in claim 1, comprises:

wherein the at least one solar panel assembly is a plurality of solar panel assemblies;

the roof of the greenhouse being an arch-shaped truss structure; and the plurality of solar panel assemblies being radially distributed about the arch-shaped truss structure.

9. The greenhouse used as a solar panel support structure, as claimed in claim 1, wherein a rotation axis of the solar tracker is oriented parallel to a proximal meridian of the Earth.

* * * * *